United States Patent [19]
Hassler

[11] 3,760,508
[45] Sept. 25, 1973

[54] METHOD FOR LOADING AND DRYING OF CERAMIC PRODUCTS PRIOR TO BAKING

[76] Inventor: Andreas Hassler, Jahnstrasse 45, Erbach, Germany

[22] Filed: Jan. 10, 1972

[21] Appl. No.: 216,640

[30] Foreign Application Priority Data
Jan. 12, 1971 Germany............... P 21 01 073.1

[52] U.S. Cl. ............................................. 34/38
[51] Int. Cl. ........................................... F26b 3/00
[58] Field of Search .............. 34/31, 33, 25, 38, 34/194, 204

[56] References Cited
UNITED STATES PATENTS
1,709,063  4/1929  Cramer.......................... 34/38 X Primary Examiner—William F. O'Dea
Assistant Examiner—Peter D. Ferguson
Attorney—William D. Hall et al.

[57] ABSTRACT

A method of loading a plurality of formed ceramic products preparatory to baking thereof comprises positioning the products adjacent to one another in a plurality of superposed layers. The layers are formed in a plurality of successive loading steps, each of which is followed by a drying step operative to dry the uppermost layer, and to further dry previously formed underlying layers, to an extent sufficient to permit placement of a further layer on the uppermost layer without deformation of the uppermost layer or toppling of the stacked layers.

6 Claims, 2 Drawing Figures

METHOD FOR LOADING AND DRYING OF CERAMIC PRODUCTS PRIOR TO BAKING

BACKGROUND OF THE INVENTION

Prior to baking in tunnel kilns, ceramic products must be predried to avoid cracking and misforming. For this purpose artificial drying means are used e.g., drying chambers, conveyor belt or tunnel type dryers. After drying, the ceramic products are loaded onto suitable trucks for baking. Arranging a tunnel kiln behind one of the above mentioned drying means is expensive especially because of the complicated transport means necessary. Because of this, new forming methods were developed, using stiff or hard formed clay. The thus formed bricks, tiles etc. are loaded onto conveyors immediately after forming and then dried. Thereby all the layers of a complete load are piled on a conveyor and then the complete load is dried. This method however leads to damage due to the damp and easily misformed material being piled. For this reason drying and baking plants have been constructed for drying and baking on a conveyor in single layers. Loading in single layers however is not economical because of the large areas involved, and the higher transport speeds which are necessary. Such higher transport speeds lead to greater wear and tear on the transport system.

Several attempts have been made to dry and bake bricks, tiles etc. of soft clay in several layers without the use of separate pre-drying. These prior attempts have, however, been unsuccessful.

It is the object of this invention to provide a method, by which it is possible to load and to dry soft formed bricks, tiles etc. in several layers and hard formed bricks etc. in more layers than has been considered feasible heretofore, with the bricks being transferred directly from the mould to a conveyor or truck.

SUMMARY OF THE INVENTION

To accomplish the foregoing object, the present invention provides a method for multi-layer loading of the foregoing ceramic products, e.g. bricks, tiles etc. for drying preparatory to baking the intermediate products into their final form. The method is characterized by procedure wherein the loading of each layer is followed by a drying period during which all previously loaded layers, already at least partially dried, are respectively further dried.

As a result of the procedure, the softest layer is always the top layer and the bottom layer bearing (the greatest load) is the hardest layer since it has been dried the longest time. Thus the layers are progressively harder from top to bottom. The layers are formed on trucks, which are loaded periodically. There is a drying-period after the loading of each layer, or after loading several layers. The drying accomplished during each drying period is such that the last loaded layer becomes hard enough to support the next soft layer without deforming the last loaded layer. Before the next fresh layer is set into place, sufficient contraction of the clay has taken place in the previously loaded layers to eliminate the danger of toppling the pile.

The conveyors or trucks are loaded in at least two cycles. Each cycle may comprise loading of more than one layer. The higher the piles the more cycles will preferably be chosen to complete the load. A number of trucks can be loaded in each cycle, being alternately loaded and dried in layers.

In case the different layers of the pile are to be separated during drying, suitable fluid, granulated or solid separating means, e.g., impregnated paper, can be inserted between the single layers. Loading of the bricks, tiles etc. may be performed mechanically, e.g. by known charging machines, or by hand. For the drier known drying means may be used.

BRIEF DESCRIPTION OF THE DRAWINGS

The drawings show the dryer in two different stages of the procedure, and are intended to be exemplary and not limitative of the invention.

DESCRIPTION OF THE PREFERRED EMBODIMENTS

Figure 1:
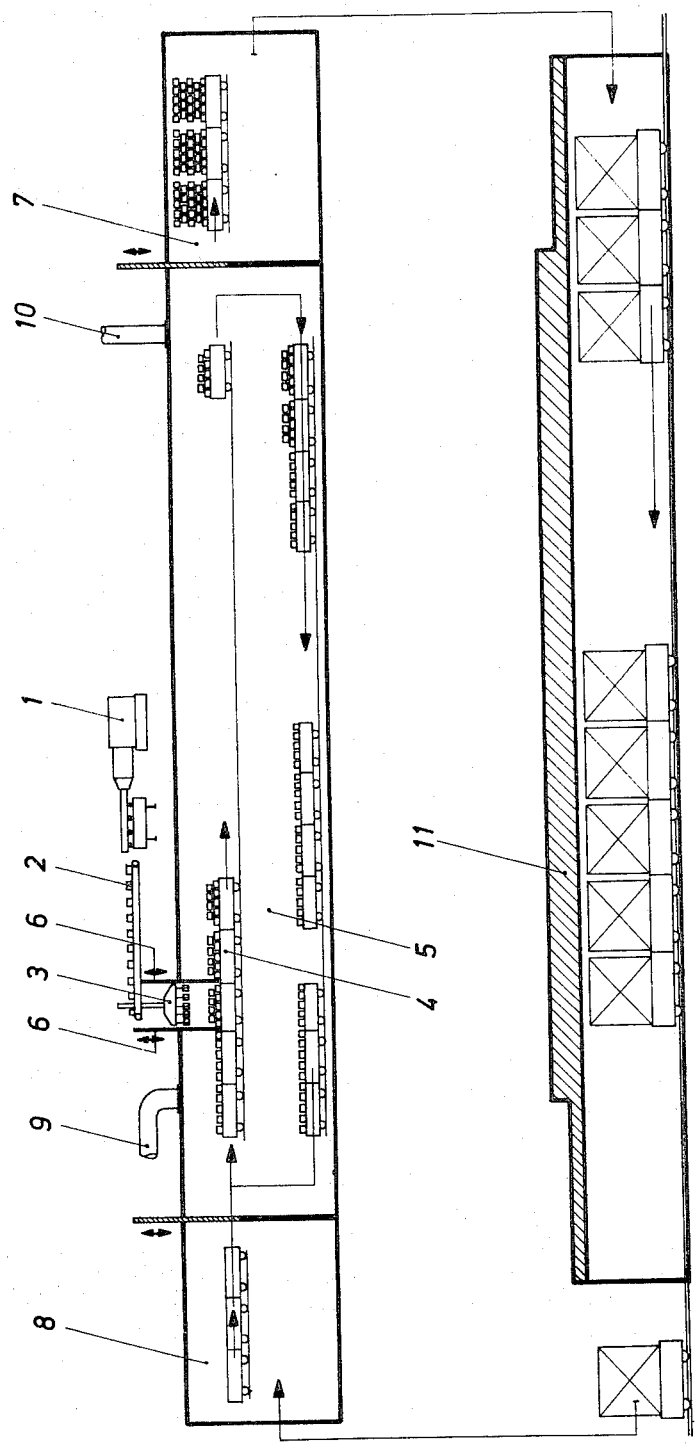
FIG. 1 illustrates the method of the present invention, wherein trucks in the drier having a first layer thereon are being loaded with a second layer.
Figure 2:
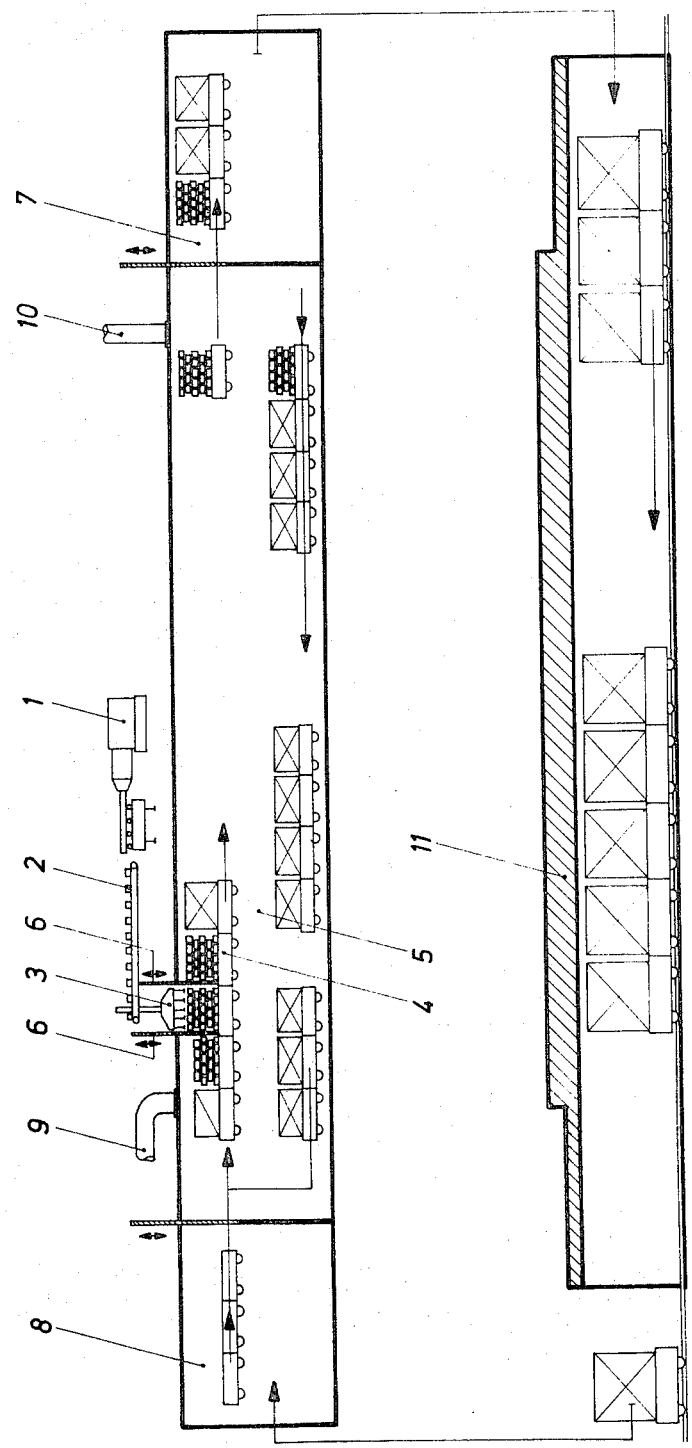
FIG. 2 shows the trucks in the dryer loaded with four layers and being loaded with the fifth layer.

The freshly moulded bricks, tiles etc. 2 cone from a moulding machine 1 and are loaded by a charging machine 3 onto conveyors or trucks 4 in a low number of layers. Subsequently each partially loaded truck is moved into a drying chamber 5 after passing through the air-lock 6 located at the loading position. At the same time the following truck moves into the loading position. This cycle continues until each of the trucks 4 in the drying chamber 5 are completely loaded. The completely loaded trucks or conveyors are then passed into a waiting chamber 7, which is positioned between the dryer and the baking unit or tunnel kiln 11, and are thereafter transported into the kiln 11 where the loads are finally baked.

A group of empty trucks is moved from a waiting room 8 to the loading position in the drying chamber 5 at the beginning of the loading and drying cycle. The time for drying may be chosen according to the number of trucks in a cycle. In the figures, conduit 9 is the hot air inlet, and conduit 10 is the hot air outlet, for the drying chamber.

The air-lock 6 separates the drying chamber 5 and the drying atmosphere therein from the surrounding atmosphere at the loading position. It is a known air-lock, and is movable up and down to prevent hot air escaping from the drying chamber 5 during loading.

It is also possible to have more than one loading position with a drying chamber between two subsequent positions.

For matter of clarity only, the cycle paths of movement of the trucks are shown vertically. The paths in fact run in a horizontal plane.

What I claim is:

1. The method of loading and drying a plurality of intermediate ceramic products preparatory to baking thereof, comprising position said intermediate products adjacent to one another in a plurality of superposed layers on a movable support structure located within a single closed hot air chamber, said superposed layers being formed by a plurality of successive loading steps interspersed respectively by a plurality of drying steps, each of said loading steps being effected by introducing a supply of said products through an air lock comprising a loading station located at a predetermined position adjacent said single drying chamber to produce at least one layer of said intermediate products on said support structure, and each of said drying steps being effected by thereafter moving said support structure away from said loading station along a predetermined close-loop path located entirely within said chamber and back to said loading station for the next loading step, the time provided for the transport of said support structure through said closed-loop path being sufficient to dry the uppermost layer produced by the next preceding loading step and to further dry all underlying layers produced by prior loading steps to an extent sufficient to prevent deformation of said previously formed layers and to give the previously formed layers sufficient structural rigidity to support at least one further layer of said intermediate products placed on said uppermost layer during the next successive loading step.

2. The method of claim 1 including the step of placing separating means on said uppermost layer following each loading step and prior to the next successive loading step.

3. The method of claim 6 wherein said closed-loop path is disposed in a horizontal plane within said drying chamber.

4. The method of claim 3 wherein said movable support structure is provided in the form of a plurality of trucks disposed in-line with one another for individual transport along said closed-loop path, said method including the step of moving each of said trucks in sequence to said loading station to receive a layer of said products, while previously loaded ones of said trucks are transported along said closed-loop path.

5. The method fo claim 4 wherein said method includes the step of providing a plurality of empty trucks in awaiting area located outside of said drying chamber, and periodically moving said empty trucks from said waiting area into said drying chamber at a position on said closed loop path upstream of said loading station.

6. The method of claim 5 including the step of diverting selected ones of said trucks out of said closed loop path and into a waiting chamber following completion of the loading and drying steps associated with said selected trucks, and thereafter transporting said selected trucks from said waiting chamber along a predetermined path through a kiln to effect baking of said products.

* * * * *